(12) United States Patent
Cohen

(10) Patent No.: US 8,587,967 B2
(45) Date of Patent: Nov. 19, 2013

(54) SYSTEM AND METHOD FOR INDIRECT CONTROL OF A CONVERTER OUTPUT

(75) Inventor: Isaac Cohen, Dix Hills, NY (US)

(73) Assignee: Texas Instruments Incorporated, Dallas, TX (US)

(*) Notice: Subject to any disclaimer, the term of this patent is extended or adjusted under 35 U.S.C. 154(b) by 459 days.

(21) Appl. No.: 12/797,151

(22) Filed: Jun. 9, 2010

(65) Prior Publication Data

US 2010/0315840 A1 Dec. 16, 2010

Related U.S. Application Data

(60) Provisional application No. 61/185,792, filed on Jun. 10, 2009, provisional application No. 61/223,535, filed on Jul. 7, 2009.

(51) Int. Cl.
*H02M 3/335* (2006.01)

(52) U.S. Cl.
USPC .......... 363/21.04; 363/21.07; 363/21.09; 363/21.12; 363/21.15; 363/21.17

(58) Field of Classification Search
USPC ......... 363/18, 20, 21.04, 21.07, 21.09, 21.12, 363/21.15, 21.17
See application file for complete search history.

(56) References Cited

U.S. PATENT DOCUMENTS

| | | | |
|---|---|---|---|
| 7,088,598 B2 * | 8/2006 | Yang et al. | 363/21.01 |
| 8,098,506 B2 * | 1/2012 | Saint-Pierre | 363/97 |
| 2005/0219870 A1 * | 10/2005 | Yang et al. | 363/21.01 |
| 2007/0008756 A1 * | 1/2007 | Djenguerian et al. | 363/95 |
| 2008/0197817 A1 | 8/2008 | Colbeck et al. | |
| 2011/0182088 A1 * | 7/2011 | Lidak et al. | 363/21.12 |

* cited by examiner

*Primary Examiner* — Nguyen Tran
(74) *Attorney, Agent, or Firm* — William B. Kempler; W. James Brady, III; Frederick J. Telecky, Jr.

(57) ABSTRACT

One embodiment of the invention relates to a power apparatus. The power apparatus includes a power converter configured to convert an input voltage to an output voltage for providing power at an output thereof to which a load is connectable. The converter can include an isolation barrier configured to electrically isolate the output and the load from an input source that provides the input voltage. The system also includes a control loop that includes indirect sense circuitry configured to indirectly derive an indication of at least one of output current and output power of the converter. The control loop is configured to control output current or output power based on the indirectly derived indication of output current or output power, respectively.

18 Claims, 5 Drawing Sheets

SYSTEM AND METHOD FOR INDIRECT CONTROL OF A CONVERTER OUTPUT

CROSS-REFERENCE TO RELATED APPLICATIONS

This application claims the benefit of U.S. Provisional Application No. 61/185,792, which was filed Jun. 10, 2009, and entitled METHOD AND CIRCUITS FOR INDIRECT CONTROL OF OUTPUT CURRENT OR POWER OF CONVERTERS, and claims the benefit of U.S. Provisional Application No. 61/223,535, which was filed Jul. 7, 2009, and entitled HIGH PERFORMANCE CONTROL ALGORITHM FOR ADAPTER APPLICATIONS, each of which identified applications is incorporated herein by reference in its entirety.

TECHNICAL FIELD

The invention relates generally to electronic circuits and, more specifically, to a system and method for indirect control of a converter output.

BACKGROUND

Power conversion systems supply power to a variety of electronic systems, such as telecom and/or data communication equipment.

Various types of power converter circuitry has been developed for converting electrical energy to one form or the other, such as from AC to DC, from DC to AC and DC to DC. Many types of power converters also utilize transformers to electrically isolate the input source and power control circuitry from the load or loads that are coupled at an output thereof. In most converter topologies, there may be only a weak or no correlation between an average output current and the peak or average current in the primary switch devices in the converter. Accordingly, in order to provide feedback associated with output power or output current, existing designs typically require direct access to the output. For instance, if no direct access is available to an output load current, it may be necessary to level shift or transfer load current information across the isolation barrier. This approach tends to significantly increase the cost and can add additional inefficiencies.

SUMMARY

One embodiment of the invention relates to a power apparatus. The power apparatus includes a power converter configured to convert an input voltage to an output voltage for providing power at an output thereof to which a load is connectable. The converter can include an isolation barrier configured to electrically isolate the output and the load from an input source that provides the input voltage. The system also includes a control loop that is configured to control the output current or power of the converter using indirect sense circuitry configured to indirectly derive an indication of at least one of output current and output power of the converter. The control loop controls the output current or output power based on the indirectly derived indication of output current or output power, respectively. As one example, the control loop can be configured to provide substantially constant output current or substantially constant output power.

Another embodiment of the invention relates to a method for controlling an output of a power converter. The method includes providing a power converter having an input and an output to which a load is connected. The output and the load are electrically isolated from an input source that generates the input current. At least one output parameter is indirectly sensed. The at least one output parameter can include an output current or output power that is provided at the output of the power converter. The input current of the converter is controlled based on the indirectly sensed output parameter.

DETAILED DESCRIPTION

The invention can be utilized to provide for accurate control of output current or output power without any direct sensing the output current or output power. Instead, a system or method implemented according to an aspect of the invention employs a control loop, which is electrically isolated from the converter output and any load connected at the output. The control loop is also configured to indirectly sense parameters and, based on the measured parameters, derive an indication of output current or output power. The derived indication of output current or power can be utilized to control one or more input parameter (e.g., input current or power) in a desired manner. For example, the control of the input parameter based on derived indication can be employed to achieve substantially constant output current or substantially constant output power. As another example, in some applications, instead of being regulated to a substantially constant value, the output current or power of the converter may regulated to track a programmable value. As used herein the term "substantially constant" in the context of power or current is utilized to denote that, while circuitry is being designed to achieve a constant value, there may be some deviation from the desired constant value, such as due to variations in component tolerances and process variations due to design and/or other operating parameters. Additional variations in the constant output power or current can exist, such as due to ripple current, which may vary depending on converter topology and its operation.

The indirectly sensed indication of output current or power can also be utilized to implement other types of controls. For instance, such other controls can be utilized for protection of circuitry (e.g., overload protection, peak output current protection, limiting output power, such as can be implemented to protect the load circuit or the power conversion circuitry. The controls can also be utilized for different purposes, for example, to display or output relevant diagnostic information for gauging operation of the power system or its related components. Those skilled in the art will understand and appreciate that the systems and methods described herein can further be implemented independent of the converter topology or operating mode.

Figure 1:
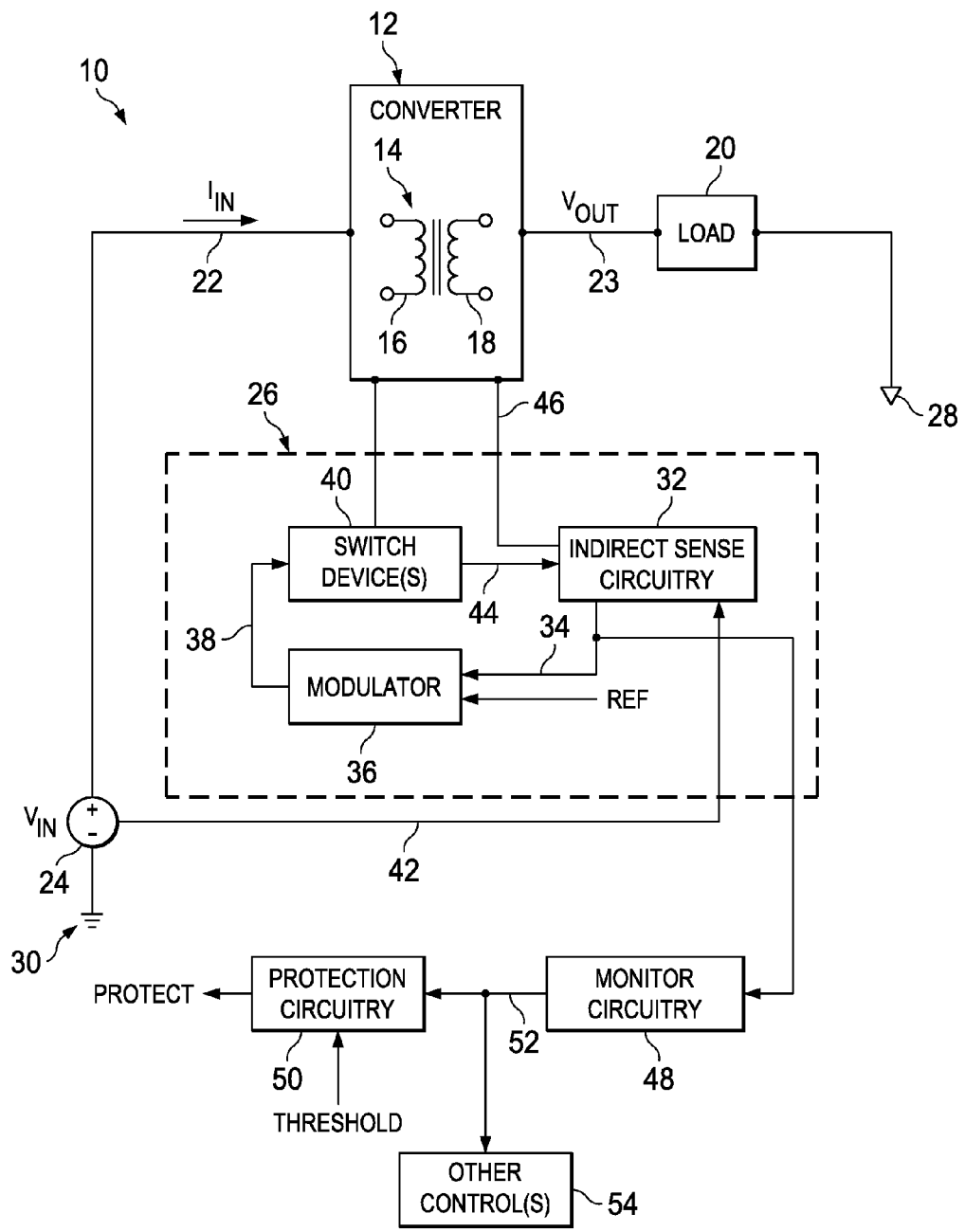
FIG. 1 depicts an example of a power conversion system that can be implemented according to an aspect of the invention.

FIG. 1 depicts an example of a power system 10. The power system 10 includes a power converter 12 that is configured to convert an input voltage $V_{IN}$ at an input 22 to a corresponding output voltage at an output 23. The converter 12 can be configured as an isolating converter that provides electrical isolation between the input 22 and output 23. Such electrical isolation is implemented by a transformer, schematically indicated at 14, which includes a primary winding 16 and at least one secondary winding 18. The primary winding 16 is inductively coupled to the secondary winding 18 such that current flowing through the primary winding 16 induces corresponding current flow through the secondary winding 18. The resulting current flow in the secondary winding in turn provides a corresponding output current at the output 23 that can be supplied to a load, indicated at 20. Any number of loads can be coupled to the output 23 of the converter 12.

The input signal can include an input current $I_{IN}$ that flows from an input voltage supply 24 having an input voltage $V_{IN}$ to an input 22 of the converter 12. The amount of input current $I_{IN}$ supplied to the primary winding 16 can be regulated by a control loop indicated at 26. The control loop 26 and its associated components are electrically isolated from the output and the load 20. For instance, the load 20 is demonstrated as being coupled to (e.g., referenced to) an isolated ground 28. In contrast, the input supply 24 is connected to a common ground indicated at 30 that is electrically isolated from the isolated ground 28. The control loop 26 and its associated circuitry are referenced to the common ground 30.

The control loop 26 can be configured to control the converter 12 as to provide a substantially constant current to the load 20 or to provide a substantially constant power to the load 20. For instance, to provide substantially constant current to the load, the control loop 26 can be configured to force the average input current of the converter 12 to be directly proportional to an output voltage at the output 23 and inversely proportional to the input voltage $V_{IN}$. To provide a substantially constant output power, the control loop 26 can be configured to force a product of the input voltage $V_{IN}$ and an average of the input current $I_{IN}$ to be substantially equal to a power reference. As explained herein, measurements and circuitry utilized to implement the control loop 26 are electrically isolated from the output and the load, but instead are referenced to the common ground 30 of the primary side of the converter 12.

In the example of FIG. 1, the control loop 26 includes indirect sense circuitry 32 that is configured to derive an indication of output current or output power indirectly, as may be dictated according to application requirements. As used herein, the term "indirect" is intended to convey that no direct measurements of the output current or output power of the converter 12 is utilized. That is, the regulated parameter is not directly sensed and the indirect sense circuitry 32 is electrically isolated from the output 23 and from the load 20 through the isolation barrier of the transformer 14, and instead is referenced to the common ground 30 associated with the primary winding 16. The indirect sense circuitry 32 is configured to derive an indication (demonstrated as an output signal 34) of output current or output power that is being provided by the converter 12 based on selected indirect measurements.

The control loop 26 also includes a modulator 36 that generates a control signal 38 based on the signal 34 from the sense circuitry 32 relative to a reference signal (REF). Those skilled in the art will understand and appreciate various ways that the modulator 36 can be configured and the corresponding reference signal REF can be generated, which may be a fixed or variable reference. For instance, the modulator 36 can implement separate or concurrent amplitude and frequency modulation. The modulator 36 can also operate in various modes, including a discontinuous conduction mode (DCM), a continuous conduction mode (CCM), a quasi-resonant (QR) mode or any combination of these or other conduction modes. The type of modulation and mode of operation can vary according to the converter topology and application requirements in which the power system 10 is implemented.

The modulator 36 can provide the control signal 38 for controlling one or more switch devices 40. For instance the switch device(s) 40 can be coupled to the primary winding 16 to provide for the flow of the input current $I_{IN}$ through the switch device(s) based on the control signal 38. The configuration of the one or more switch devices 40 can vary according to the converter topology.

By way of further example, to provide constant output power, the indirect sense circuitry 32 can be configured to derive an indication of the input voltage $V_{IN}$, such as via a connection schematically indicated at 42. The indirect sense circuitry 32 can also be coupled to derive an indication of the input current 22, such as via a connection indicated at 44. In this example embodiment (e.g., for substantially constant output power), the sense circuitry 32 can include a voltage detector for providing an indication of the input voltage and a current detector for providing an indication of an average of the input current $I_{IN}$ based on the respective signals via the connections 42 and 44. Those skilled in the art will understand and appreciate various types of circuitry and devices that can be implemented to detect voltage and current, and which can operate in the analog domain, digital domain or a combination thereof (e.g., hybrid).

As one example, the sense circuitry 32 can further be configured to provide an output signal at 34 that is proportional to a product of the input voltage and the average of the input current. In this example, the reference signal REF provided to the modulator 36 can be implemented as a power reference signal. The modulator 36 is configured to provide its control signal 38 to control the switch devices based on the power reference signal and the product signal provided at 34 by the sense circuitry 32, such that the substantially constant output power is provided by the converter 12 to the load 20. This regulation of the input power ($P_{IN}$) as a means to achieve substantially constant output power ($P_{OUT}$) can be demonstrated as follows:

$$P_{IN} = V_{IN} * I_{IN\_AVE} = P_{OUT}/\eta \qquad \text{Eq. 1}$$

where $\eta$ is the efficiency of the converter

From the foregoing Equation 1, it is shown that the input power is proportional to the output power times the efficiency $\eta$. Generally, the efficiency $\eta$ is nearly identical for any mass produced converter and its typical value known for all operating conditions of the converter. Accordingly, a correction factor equal to the reciprocal of $\eta$ can be used to trim the power reference REF to a value that will regulate the output power, such as to deliver substantially constant output power based on indirect measurement of the output power. Depending on application requirements, the power reference REF can be fixed or variable. For instance, since the efficiency can vary according to operating parameters, a reference generator can be controlled to vary the reference signal REF according to an expected or known efficiency, such as can be adjusted based on one or more operating parameters (e.g., input power, temperature, input voltage or the like).

As another example, the indirect sense circuitry 32 can be configured to provide its output signal 34 as a signal that is proportional to the output voltage and inversely proportional to the input voltage, such as to regulate the input current $I_{IN}$ to achieve a substantially constant output current to the load 20. In this regard, the indirect sense circuitry 32 can be coupled to a secondary sense winding of the transformer 14, which is electrically isolated from the secondary winding 18 as well as the output and the load 20. That is, the sense winding is referenced to the common ground 30 and is electrically isolated from the isolated ground 28. For instance, the indirect sense circuitry 32 can include an output voltage detector that receives the indication of the output voltage via the connection 46. Such voltage detector can be implemented, for example, by implementing sample and hold circuitry, by peak voltage detection or by other methods. The indirect sense circuitry 32 can also receive the indication of the input voltage $V_{IN}$ via the connection 42. The indirect sense circuitry 32 can further be configured to generate its output signal at 34, which is proportional to the output voltage $V_{OUT}$ and inversely proportional to the input voltage $V_{IN}$. The control loop 26 further can be configured to force the average input current to be equal to the proportional signal provided at 34 which can be utilized to generate an error signal based on a difference between the average input current and the proportional signal (e.g., computed from the output voltage $V_{OUT}$ and input voltage $V_{IN}$). The average input current can be detected based on the signal via the connection 44. For instance, the indirect sense circuitry 32 can be configured to include circuitry (e.g., a filter) that provides a signal indicative of the average input current.

This regulation of the average input current ($I_{IN}$) as a means to achieve substantially constant output current ($I_{OUT}$) can be demonstrated as follows:

$$\eta * V_{IN} * I_{IN\_AVE} = V_{OUT} * I_{OUT} \qquad \text{Eq. 2}$$

By implementing the control loop 26, as described above, the average input current $I_{IN\_AVE}$ can be regulated as follows:

$$I_{IN\_AVE} = (K * V_{OUT})/V_{IN} \qquad \text{Eq. 3}$$

where: K is a proportionality constant that can be user defined, such as by configuring the control loop 26 and detection circuitry in the indirect sense circuitry 32.

Thus, by substituting $I_{IN\_AVE}$ from Eq. 3 into Eq. 2, Equation 2 can be rewritten as follows:

$$\eta * K * V_{out} = V_{OUT} * I_{OUT} \qquad \text{Eq. 4.}$$

Assuming that $V_{OUT} > 0$, solving for the output current $I_{OUT}$ provides for constant output current as follows:

$$I_{OUT} = \eta * K \qquad \text{Eq. 5}$$

In order to ensure that $V_{OUT} > 0$ when the converter starts, a small DC offset (e.g., about several mV or other voltage levels) can be added to the detected output voltage. To improve accuracy, this offset may be removed when the output voltage increases above a predetermined value.

The output signal 34 from the indirect sense circuitry 32 can also be provided to one or more additional controls 50 and/or 54, which can be analog, digital or a hybrid of analog and digital controls. For example, the signal 34 can be acquired by monitor circuitry 48. The monitor circuitry 48 can be configured to convert the signal 34 from the indirect sense circuitry 32 to a corresponding output signal 52 having a value that can be utilized for a variety of different purposes.

For example, the monitor circuitry 48 can provide the output signal 52 to protection circuitry 50. The protection circuitry can compare the output signal 52 from the monitor circuitry 48 relative to a threshold and based upon the comparison provide a corresponding protection signal (PROTECT). For instance, depending upon the configuration of the indirect sense circuitry 32 and the type of controls being implemented, the protection circuitry 50 can be implemented to provide for output current protection (e.g., if the indirect sense circuitry provide an indirect measurement of the output current) or the protection circuitry can be utilized to provide power protection (e.g., when the sense circuitry 32 is utilized to provide an output proportional to the output power). Alternatively or additionally, the protection circuitry 50 can be configured to monitor the rate of change of the output signal 52 or other operating parameters for implementing controls.

In addition or as another alternative, the monitor circuitry 48 can provide its output 52 to one or more other controls 54. These controls 54 can be utilized for diagnostic purposes, such as displaying an indication of the derived measured parameter at 34, as well as other purposes that may be apparent to one of ordinary skill in the art. The protection circuitry 50 or the other controls 54 can also implement a timer that can be utilized to determine if an operating parameter (e.g., voltage, current and/or power) or its rate of change exceeds a maximum set value for a predetermined period of time and, if so, implement desired protective controls (e.g., decreasing an input or output operating parameter or deactivating the converter) for the power system 10.

Figure 2:
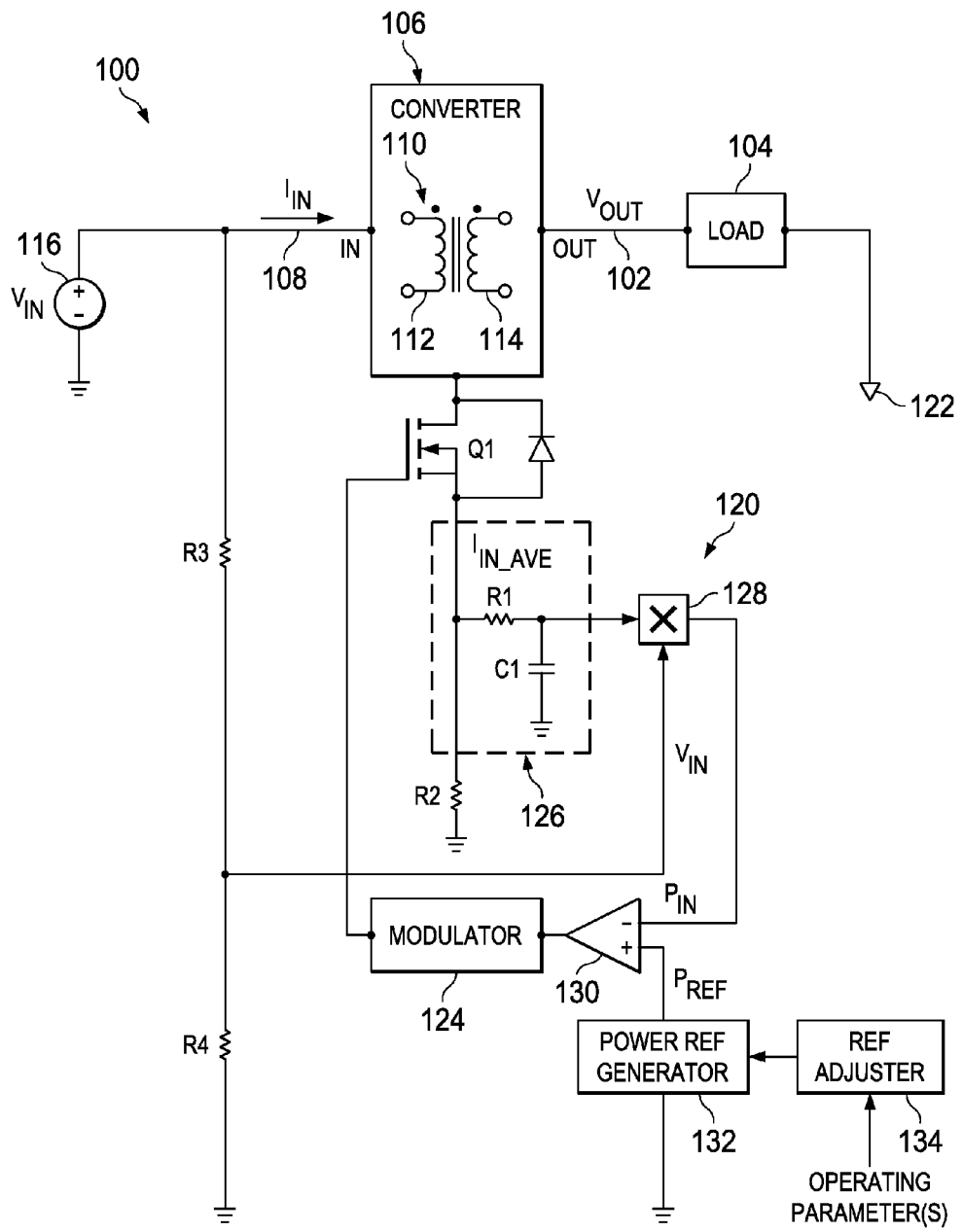
FIG. 2 depicts an example of another power conversion system that can be implemented according to an aspect of the invention.

FIG. 2 depicts an example of a power system 100 that is configured to provide a substantially constant output power at an output 102 to which a load 104 is connected. The power system 100 includes a converter 106 that is configured to convert an input voltage provided at an input 108 to corresponding output voltage signal at the output 102. In the example of FIG. 2 the converter is depicted as a DC-DC isolation converter. It will be understood and appreciated that any converter topology can be utilized and that the system 100 can operate the converter 106 in a variety of one or more different modes to achieve the substantially constant output power based on the teachings contained herein.

The converter 106 can be implemented as an isolation converter that includes a transformer 110 having a primary winding 112 and at least one secondary winding 114. The input 108 thus is connected to the primary winding 112 for providing corresponding input current $I_{IN}$ from a power supply 116 that provides an input voltage $V_{IN}$, which can be a DC input voltage (e.g., for a DC-DC converter 106).

A control loop 120 is configured to regulate the power system 100 for providing the substantially constant output power at the output 102. The control loop 120 is electrically isolated from the output 102 and the load 104. Thus, in the example of FIG. 2, the control loop and associated circuitry on the primary side is referenced to a common ground or reference potential, whereas the output load 104 and secondary winding 114 are referenced relative to an isolation ground 122. The control loop 120 includes one or more switch device which is demonstrated in the example of FIG. 2 as a transistor Q1, such as a metal oxide field effect transistor (MOSFET). A modulator 124 is configured to provide a control signal to the gate of Q1 to control current flow (e.g., corresponding to the input current $I_{IN}$) through the transistor Q1 and through the primary winding 112.

In the example of FIG. 1, the control loop 120 is configured so that the modulator 124 controls Q1 to regulate the input power of the system 100 to achieve a substantially constant output power. As described herein, this is achieved because the efficiency of the converter 106 can be known or otherwise determined empirically. In many situations, the efficiency of the converter 106 is sufficiently high such that regulating the input power to a fixed power reference can result in substantially constant output power. Alternatively, the power reference can be varied as a function of operating parameters, such as described herein.

When the modulator 124 activates the transistor Q1, the input current $I_{IN}$ flows to a filter 126. The filter 126 can be configured so as to provide an output signal corresponding to an indication of the average input current $I_{IN}$. For instance, in the example of FIG. 2, the input current $I_{IN}$ flows through a shunt resistor R2 so the voltage across R2 corresponds to the instantaneous input current. The voltage appearing across R2 is applied to a low pass filter consisting of resistor R1 and capacitor C1. The voltage across capacitor C1 represents the time average indication of the input current $I_{IN\_AVE}$.

The control loop 120 also includes an input voltage detector, which in the example of FIG. 2 is illustrated as including a voltage divider formed of resistors R3 and R4. The interconnecting node of R3 and R4 thus can provide a signal proportional to the input voltage indicated at $V_{IN}$. A combiner, such as a multiplying circuitry 128, can multiply the average input current $I_{IN\_AVE}$ times the indication of the input voltage $V_{IN}$ to provide an output signal that is proportional to the input power $\sim P_{IN}$ at the output 102. The components in the detection circuitry of the control loop 120 further can be configured so that the efficiency of the converter 106 is accounted for, such that the output of the multiplier 128 can be substantially equal to $P_{OUT}$.

The power output signal from the multiplier can be supplied to an inverting input of an error amplifier 130. A power reference $P_{REF}$ can be provided to the non-inverting input of the error amplifier 130. In this way, of the error amplifier 130 can provide closed loop feedback signal operative to force the input power, as represented by the $P_{IN}$ from the multiplier 128, to a substantially constant power reference, as represented by the $P_{REF}$ value. The error amplifier 130 can provide its output error signal to the modulator 124 for generating its control signal to the transistor Q1, which results in the constant output power at 102. Advantageously, this constant output power can be achieved indirectly by regulating the input power instead of direct output power regulation.

As mentioned above, the power reference $P_{REF}$ can be fixed or it can be variable. This power reference $P_{REF}$ value can also be user programmable, such as to set the output power to a desired level for a given application. For instance, the power reference $P_{REF}$ can be provided by a power reference generator 132. The power reference generator can provide a substantially fixed DC voltage having a value that is normalized and indicative of a desired output power. Additionally, the system 100 can include a reference adjuster 134 that can be configured to control the power reference generator to adjust the power reference during operation. The reference adjustor 134 can vary the power reference $P_{REF}$ based on one or more operating parameters. The operating parameters can include, for example, temperature, input voltage $V_{IN}$, input power $P_{IN}$ as well as any other parameter that can affect the efficiency of the converter 106. As one example, the reference adjuster 134 can be implemented as a look up table that can be indexed according to any one or more of the operating parameters described herein (e.g., temperature, input voltage $V_{IN}$, input power $P_{IN}$, output power $P_{OUT}$ or the like). As a result, the reference adjustor 134 can employ the operating parameter(s) to ascertain a corresponding efficiency factor and, in turn, adjust (e.g., increase or decrease) the power reference $P_{REF}$ by commanding the power reference generator 132 accordingly. Additional interpolation between adjacent entries in a look-up table can be utilized for increased accuracy in the reference adjustments being made. Thus, as one or more operating parameters may change during operation, the reference adjustor can adjust the power reference $P_{REF}$ to compensate for such changes and thereby maintain the desired substantially constant output power.

Figure 3:
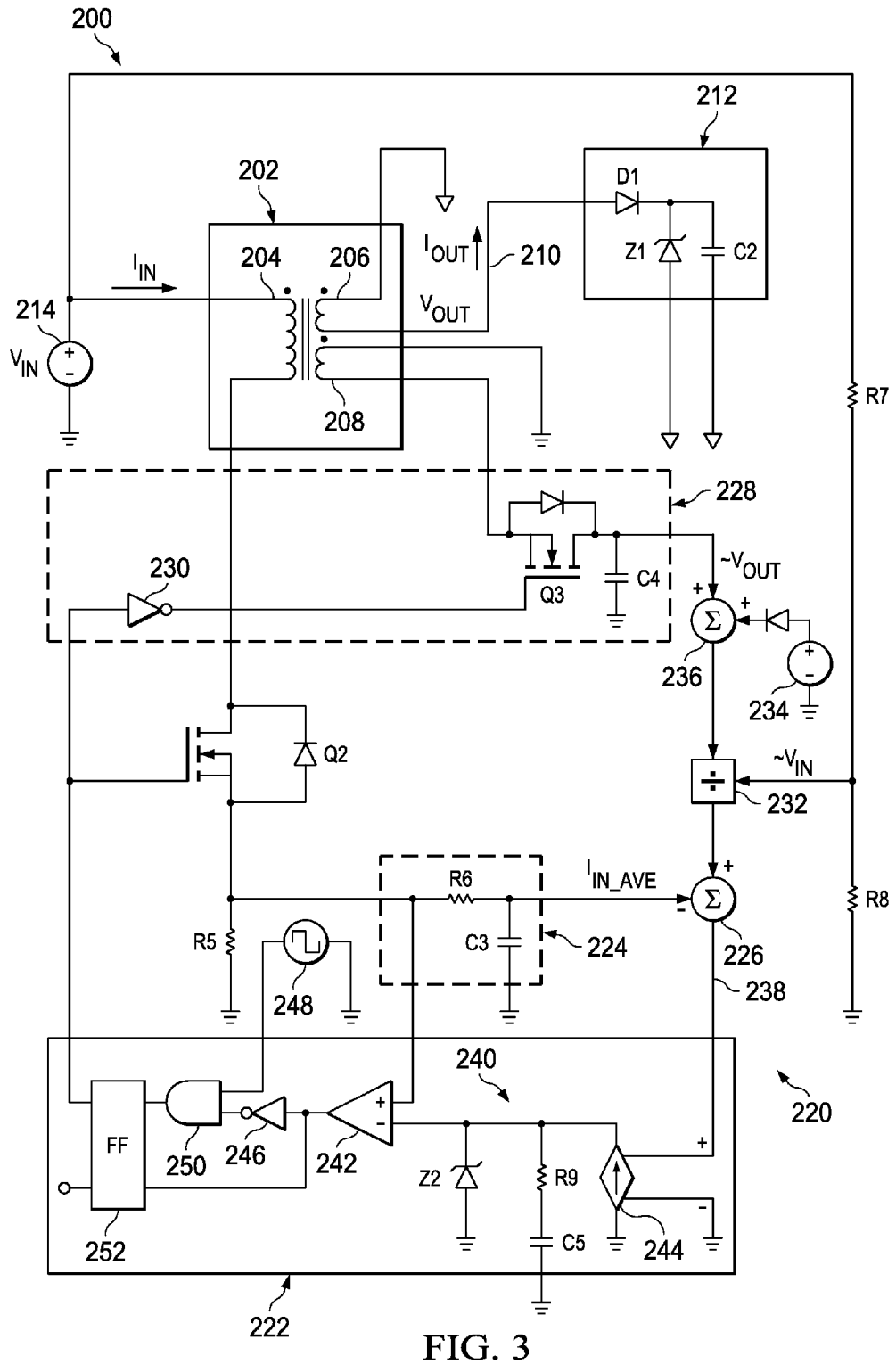
FIG. 3 depicts still another embodiment of a power conversion system that can be implemented according to an aspect of the invention.

FIG. 3 depicts another example of another power conversion system 200. The power conversion system 200 is depicted as an isolated power converter that includes a transformer 202 having a primary winding 204, a secondary winding 206 and an auxiliary sense winding 208. The primary winding 204 and the sense winding 208 are electrically isolated from the secondary winding 206 and an output of the converter indicated at 210. A load 212 can be connected at the output 210 to receive electrical power. As in the other examples shown and described herein, the secondary winding 206 and the output 210 as well as the corresponding load 212 are referenced to an isolated ground, whereas the other circuitry including the sense winding 208, primary winding 204 and input supply voltage 214 are referenced relative to a common ground. The power system 200 includes a control loop 220 that is configured to indirectly regulate output current $I_{OUT}$ by forcing an average of its input current $I_{IN\_AVE}$ to be substantially equal to a signal that is proportional to the output voltage $V_{OUT}$ and inversely proportional to the input voltage $V_{IN}$.

In the example of FIG. 3, the power conversion system 200 is demonstrated as a DC-to-DC flyback converter that converts the DC input $V_{IN}$ to a corresponding output $V_{OUT}$ at the output 210. For purposes of illustration, the load 212 is demonstrated in the context of a light emitting diode (LED) that includes a diode D1, zener diode Z1 and associated capacitor C2, each of which is referenced to the isolated ground reference. The power system 200 thus can be implemented as an LED driver configured to provide a substantially constant output current for driving the load 212 without any LED current sensing.

In the example implementation of FIG. 3, the power system 200 includes a transistor Q2 that is electrically coupled to the primary winding 204. The transistor Q2 is controlled by a modulator 222 that provides a modulated output signal to the gate of Q2 for controlling current flow there through. As described herein, the modulator 222 can be implemented according to different types of modulation (e.g., pulse-width modulation, amplitude modulation or frequency modulation) as well as operate in different types of operating modes (e.g., CCM or DCM). In response to activation of transistor Q2, the input current $I_{IN}$ flows through the primary winding 204. When transistor Q turns off, the current $I_{IN}$ is transferred to the secondary winding 206 as an output current $I_{OUT}$. As long as the current $I_{OUT}$ flows in the secondary winding 206, a voltage proportional to the output voltage appears across the sense winding 208.

The input current $I_{IN}$ through the primary and transistor Q2 results in current flowing through current sense circuitry of the control loop 220. The current sense circuitry can include shunt resistor R5 and filter 224. The filter 224 can be implemented as an RC filter having an appropriate time constant so that the filter 224 provides an indication of the average input current $I_{IN\_AVE}$. In the example of FIG. 3, the filter 224 is implemented as including a resistor R6 connected in series with a capacitor C3. The average input current $I_{IN\_AVE}$ can be provided to a negative input of a summing junction 226.

The control loop 220 is also configured to detect a signal that is inversely proportional to the input voltage indicated at $\sim V_{IN}$. For instance, a voltage detector can be implemented as a voltage divider that includes series resistors R7 and R8 connected in parallel with the input supply 214. The voltage detector (formed of resistors R7 and R8) are referenced relative to the common ground reference of the primary side of the transformer 202.

The control loop 220 also includes an output voltage detector 228 that is configured to provide a signal that is proportional to the output voltage $V_{OUT}$ that develops across the sense winding 208. The sense winding 208 and the output voltage detector 228 are referenced relative to the common ground reference of the primary side of the transformer 202.

In the example of FIG. 3, the output voltage detector 228 is illustrated as including sample-hold circuitry that is configured to sample and hold a voltage signal that is proportional to the output voltage $V_{OUT}$. The sampling and holding can be controlled based on the control signal provided by the modulator 222. For instance, the output of the modulator 222 can be provided to an inverter 230 that provides an inverted indication of the control signal to a gate of a transistor Q3. When Q3 is activated current flows across a corresponding capacitor C4, which provides a voltage signal ($\sim V_{OUT}$) that is proportional to the output voltage $V_{OUT}$ at the output 210. The timing of the sampling and holding can be optimized (e.g., via configuring the inverter) to ensure a desired voltage proportional to the output voltage is captured across the capacitor C4. For instance, the sampling can be delayed until the ringing caused by imperfect inductive coupling through the windings subsides and be terminated before the voltage across winding 208 ceases to be proportional to the output voltage.

A divider circuit 232 can be configured to provide a corresponding quotient output signal that is directly proportional to the output voltage $V_{OUT}$ and inversely proportional to the input voltage $V_{IN}$. That is, the detected output voltage ($\sim V_{OUT}$) across the capacitor C4 and the input voltage ($\sim V_{IN}$) provided by the voltage divider of R7 and R8 are provided as inputs to the divider circuit 232. The divider 232 provides the quotient signal to a positive input of the summing junction 226.

To mitigate the situation at start-up if the output voltage is zero an offset voltage source 234 can provide a DC offset voltage through a diode D2 to an input of a summing junction that as the offset voltage (e.g., less the drop across the diode). The DC offset thus can be added to detected output voltage ($\sim V_{OUT}$) signal to ensure that the indication of output voltage in the control loop is greater than zero.

The summing junction 226 operates in the control loop 220 to force the average input current signal $I_{IN\_AVE}$ to be equal to the quotient signal, which that is proportional to the output voltage $V_{OUT}$ and inversely proportional to the average input voltage $V_{IN}$. In this way, the output current $I_{OUT}$ that is provided by the transformer 202 to the output load 212 can be substantially constant without directly monitoring the output current. Thus, in the example of FIG. 3, the difference between the average input current $I_{IN\_AVE}$ and the quotient signal from 232 is provided as an input signal 238 to the modulator 222. The part of the control loop 220 that provides the input signal 238 corresponds to an outer control loop for regulating the output current $I_{OUT}$ to be substantially constant.

The control loop 220 can also include an inner control loop for controlling the input current $I_{IN}$ based on the outer control loop's signal 238. The voltage across resistor R5 can be provided as another input to the modulator 222 for implementing the inner loop regulation of the input current. The difference signal 238 (from the outer control loop) can be provided to a current error amplifier 240 that is utilized to generate a corresponding error signal that is provided to an inverting input of a comparator 242. The error amplifier 240 can be formed of a current control source 244 that is in parallel with a resistor R9 and capacitor C5, which is also in parallel with a Zener diode Z2. The comparator 242 compares instantaneous input current with an amplified representation of the difference signal 238 to provide a corresponding output reference signal to an inverter 246. An AND-gate can AND the output of the inverter 244 together with a clock signal from a clock source 248 to provide a corresponding logic signal. The logic signal can be provided to corresponding logic (e.g., an SR flip flop) that provides a corresponding control signal for activating transistor Q2 based on the regulation implemented by the control loop. As a result of such regulation of the average input current $I_{IN\_AVE}$ (see, e.g., Eqs. 2-5) the output current $I_{OUT}$ at 210 can be controlled to provide substantially constant level in the absence of directly measuring the output current.

Figure 4:
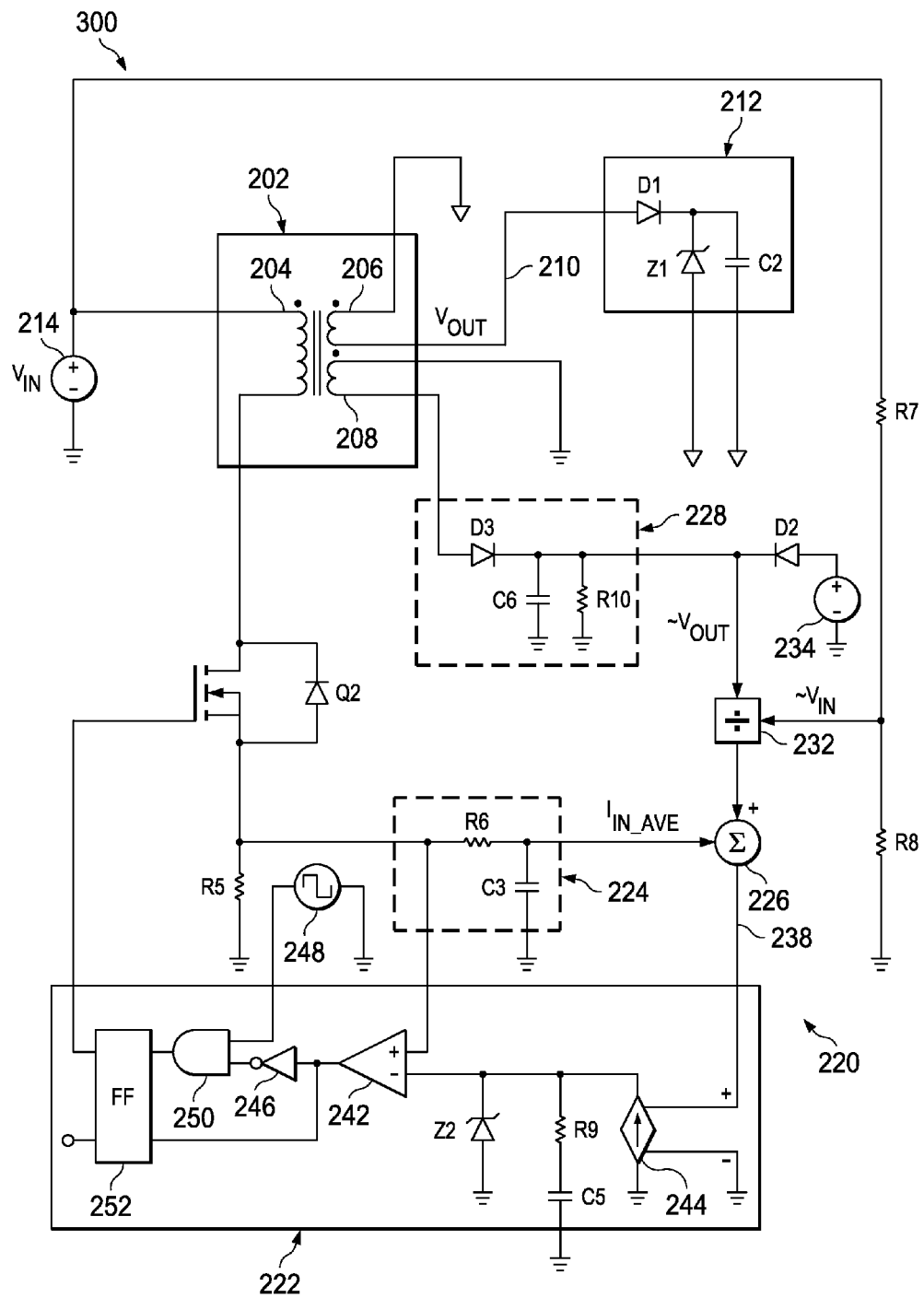
FIG. 4 depicts yet another example of a power conversion system that can be implemented according to an aspect of the invention.

FIG. 4 depicts yet another example of a power system 300 that can be implemented to provide substantially constant output current $I_{OUT}$ to a load by forcing the average input current $I_{IN\_AVE}$ to be substantially equal to a signal that is proportional to the output voltage $V_{OUT}$ and inversely proportional to the input voltage $V_{IN}$. The system 300 in FIG. 4 is similar in many respects to the system 200 shown and described with respect to FIG. 3. Accordingly, like reference characters are utilized in FIG. 4 to refer components previously introduced with respect to FIG. 3. Reference can be made to the description of FIG. 3 for additional information about these common components.

The difference between the implementations of FIGS. 3 and 4 resides in the output voltage detector 228. The output voltage detector 228 in FIG. 4 is implemented using a peak voltage detector to sense the output voltage $V_{OUT}$. For instance, in the example of FIG. 4, the output voltage detector 228 includes a diode D3 that supplies the current induced on the sense winding 208 to a parallel combination of a capacitor C6 and a resistor R10. Thus, as the transistor Q2 is activated to conduct current through the primary winding 204 the induced current through the sense winding 206 biases diode D3 that in turn charges capacitor C6 which in turn can be discharged through resistor R10 according to the resistance thereof. A DC offset voltage further can be applied to the output voltage through the diode D2 such as described herein so that the detected output voltage $V_{OUT}$ remains greater than zero volts. The divider 232 provided a corresponding quotient signal that is proportional to the output voltage $V_{OUT}$ (e.g., the peak output voltage) and inversely proportional to the input voltage $V_{IN}$. The summing junction 226, as part of an inner control loop, forces the average input current $I_{IN\_AVE}$ to be equal to the quotient signal from the divider 232, which results in supplying the output current $I_{OUT}$ to the load 212 at substantially constant level. As described herein, the level of the output current can be set by configuring the components in the control loop 220 with corresponding values.

Figure 5:
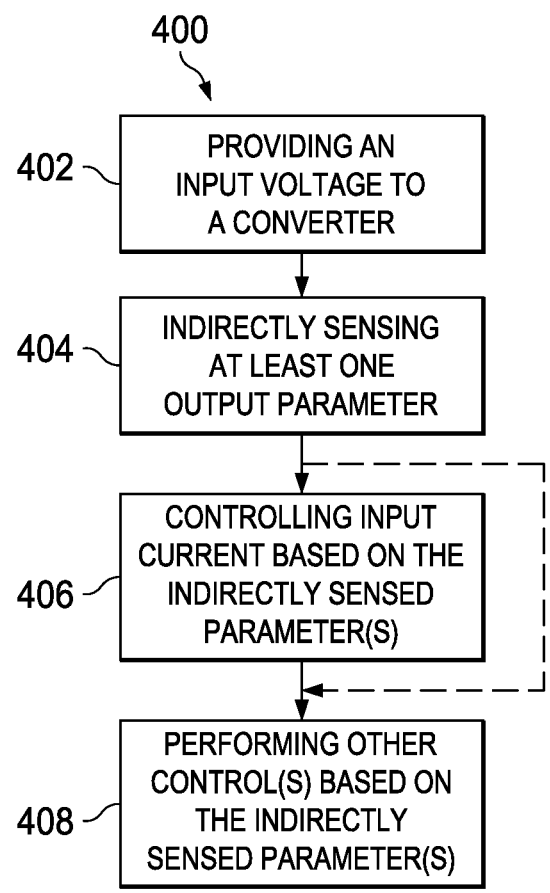
FIG. 5 is a flow diagram depicting an example of a method for indirect control of a power converter that can be implemented according to an aspect of the invention.

In view of the foregoing structural and functional features described above, a methodology in accordance with various aspects of the invention will be better appreciated with reference to FIG. 5. While, for purposes of simplicity of explanation, the methodology of FIG. 5 is shown and described as executing serially, it is to be understood and appreciated that the invention is not limited by the illustrated order, as some aspects could, in accordance with the invention, occur in different orders and/or concurrently with other aspects from that shown and described herein. Moreover, not all illustrated features may be required to implement a methodology in accordance with an aspect of the invention.

FIG. 5 illustrates an example of a method 400 for controlling a power system such as shown and described herein (e.g., any of the power systems 10 of FIG. 1, 100 of FIG. 2, 200 of FIG. 3, 300 of FIG. 4). The method 400 begins at of 402 in which an input voltage is generated to provide power at an output of a converter. The converter can be an isolation converter, such as shown and described herein (e.g., the converter 12 of FIG. 1). For instance, a power source can provide the input voltage that is utilized to generate an input current to induce an output current on a secondary winding of a transformer for providing power at an output of the converter to which a load is connected. As described herein, the output and the load are electrically isolated from the input source that generates the input current.

At 404, at least one output parameter is indirectly sensed. The at least one output parameter can include an output current and/or an output power that is provided at the output of the converter. The sensing can be performed indirectly via sense circuitry of a control loop, such as shown and described herein (e.g., the sense circuitry 32 of the control loop 26 in FIG. 1). The sense circuitry, which is isolated from the output and load, can also be configured to derive an indication of the output power or output current based on the indirect sensing.

At 406, the input current is controlled based on the indirectly sensed output parameter. The control can be implemented by a control loop that is electrically isolated from the output and the load, such as shown and described herein (e.g., the control loop 26 of FIG. 1). At 408, additional controls can be performed based on the parameters indirectly sensed at 404. Such additional controls can be implemented by monitor and protection circuitry and other controls, such as shown and described herein (e.g., the circuitry 48, 50 and 54 of FIG. 1). It will be understood that the sensing at 404 can be performed for other purposes and separately from controlling the output power or current, as indicated by the dotted line from 404 to 408.

In view of the foregoing, those skilled in the art will appreciate that the methods (e.g., of FIG. 5) for controlling a power system (e.g., the control loop 26 of FIG. 1, control loop 120 of FIG. 2, control loop 220 of FIGS. 3 and 4) can be implemented as an analog circuitry, digital circuitry or a combination of analog and digital circuitry (e.g., a hybrid). Various optimizations may also be implemented on any of the system or methods shown and described herein. Examples of programmable parameters can include: a maximum intermittent output current, a maximum continuous output current, an overload time out, a maximum primary peak current, maximum-minimum frequency, frequency transfer function and maximum duty cycle.

Voltage and current loop compensation can also be implemented as well as sample hold and delay and sampling durations can be controlled to effectively sample various signals to implement the indirect regulation shown and described herein. Such parameter optimization and adjustment can be static or may be implemented dynamically provided for adaptive adjustment as a function of operating conditions (e.g., input and output voltage), current conditions which can be sensed directly shown and described herein.

Those skilled in the art will further understand and appreciate various benefits associated with the systems and methods disclosed herein. For example, the system and methods allow significant improvement in performance and cost of primary referenced current regulation and overload protection circuits. Additionally, as described herein, the approach is independent of topology and mode of operation, and thus can be used with "difficult" topologies, such as quasi-resonant converters, LLC converters, and the like.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power apparatus comprising:
a power converter configured to convert an input voltage to an output voltage for providing power at an output thereof to which a load is connectable, the converter including an isolation barrier configured to electrically isolate the output and the load from an input source that provides the input voltage; and
a control loop that comprises indirect sense circuitry configured to indirectly derive an indication of at least one of an output current and an output power that is provided at the output of the converter without connection to the output of the converter, the control loop being configured to regulate an input current of the converter according to the derived indication so that an average input current equals (K*Vout)/Vin, where K is a constant, whereby the output current is regulated.

2. A power apparatus comprising:
a power converter configured to convert an input voltage to an output voltage for providing power at an output thereof to which a load is connectable, the converter including an isolation barrier configured to electrically isolate the output and the load from an input source that provides the input voltage;
a control loop that comprises indirect sense circuitry configured to indirectly derive an indication of at least one of an output current and an output power that is provided at the output of the converter, the control loop being configured to regulate an input current of the converter according to the derived indication, wherein the control loop comprises control circuitry configured to force an average of the input current to be substantially equal to a signal that is proportional to the output voltage and inversely proportional to the input voltage, and wherein the converter further comprises a transformer having a primary winding and a secondary winding, the apparatus further comprising:
a first voltage detector configured to provide a first signal that is proportional to the input voltage;
a second voltage detector coupled to a sense winding of the transformer that is electrically isolated from the output, the second voltage detector being configured to provide a second signal that is proportional to the output voltage; and
a combiner that combines the first signal and the second signal to provide a quotient signal that is proportional to the output voltage and inversely proportional to the input voltage;
circuitry configured to provide a signal corresponding to the average of the input current; and
a modulator that is configured to control the input current based on a difference between the signal corresponding to the average of the input current and the quotient signal.

3. The apparatus of claim 2, further comprising an adder that increases the second signal by an offset to ensure that the output voltage represented by the second signal remains greater than zero volts at least when the output voltage of the converter equals zero.

4. The apparatus of claim 2, further comprising monitor circuitry configured to provide an indication of the output current based on the quotient signal.

5. The apparatus of claim 4, further comprising protection circuitry configured to provide a protection signal in response to detecting a fault condition based on at least the quotient signal.

6. The apparatus of claim 1, wherein the control loop comprises circuitry configured to force a product of the input voltage and an average of the input current to be substantially equal to a power reference.

7. The apparatus of claim 6, wherein the converter comprises a transformer having a primary winding and a secondary winding, the apparatus further comprising
voltage detection circuitry configured to provide a signal that is proportional to the input voltage;
circuitry configured to provide an average signal corresponding to the average of the input current;
a combiner that is configured to produce a power signal corresponding to the output power based on the signal proportional to the input voltage and the average signal, the power signal being proportional to the product of the input voltage and the average of the input current;
a modulator that is configured to control the input current through the primary winding based on the power signal relative to a power reference signal.

8. The apparatus of claim 7, further comprising a power reference generator that is configured to vary the power reference signal as a function of at least one operating parameter.

9. The apparatus of claim 8, wherein the at least one operating parameter comprises at least one of the power signal, the signal proportional to the input voltage, temperature, and an efficiency of the converter.

10. The apparatus of claim 7, further comprising monitor circuitry configured to provide an indication of the output power based on the power signal.

11. The apparatus of claim 7, further comprising protection circuitry configured to provide a protection signal in response to detecting a fault condition based on at least the power signal.

12. A method for controlling an output of a power converter having an input and having an output to which a load is connected, the output and the load being electrically isolated from an input source, comprising:
providing an input voltage at the input of the converter;
indirectly sensing at least one output parameter of the power converter without connection to the output of the converter, the at least one output parameter including at least one of an output current and an output power that is provided at the output of the converter; and
controlling an input current of the converter based on the indirectly sensed at least one output parameter so that an average input current equals (K*Vout)/Vin, where K is a constant, whereby the output current is regulated.

13. A method for controlling an output of a power converter having an input and having an output to which a load is connected, the output and the load being electrically isolated from an input source, comprising:
providing an input voltage at the input of the converter;
indirectly sensing at least one output parameter of the power converter, the at least one output parameter including at least one of an output current and an output power that is provided at the output of the converter;
controlling an input current of the converter based on the indirectly sensed at least one output parameter, wherein the indirectly sensed at least one output parameter includes the output current, the method further comprising:
detecting an average indication of the input current via current sense circuitry that is electrically isolated from the load and the output; and
the controlling further comprising forcing the average indication of the input current to be substantially equal to a signal that is proportional to an output voltage at the output and inversely proportional to the input voltage such that the output current is substantially constant;
detecting a first signal that is proportional to the input voltage via circuitry that is electrically isolated from the load and the output;
detecting a second signal that is proportional to the output voltage via circuitry that is electrically isolated from the load and the output; and
generating a reference signal as a function of the first signal and the second signal, the reference signal being proportional to the output voltage and inversely proportional to the input voltage,
wherein the controlling is performed to provide the substantially constant output current based on a difference between the average indication of the input current and the reference signal.

14. The method of claim 12, wherein the indirectly sensed at least one output parameter includes the output power, the method further comprising:
providing an average current signal that represents an average of the input current via circuitry that is electrically isolated from the load and the output, and
wherein the controlling further comprises controlling the input current based on a product of the input voltage and the average of the input current.

15. The method of claim 14, wherein the controlling further comprises controlling the input current based on the product of the input voltage and the average of the input current to be equal to a power reference such that the output power is substantially constant.

16. The method of claim 15, further comprising
detecting a signal that is proportional to the input voltage via circuitry that is electrically isolated from the load and the output; and
producing a power signal corresponding to a product of the signal proportional to the input voltage and the average current signal, the power signal being proportional to a product of the input voltage and the average of the input current;
wherein the controlling further comprises controlling the input current based on a difference between the power signal and the power reference.

17. The method of claim 15, further comprising adjusting the power reference as a function of at least one operating parameter so that the output power remains substantially constant.

18. The method of claim 12, further comprising performing a protection based on the indirectly sensed at least one output parameter.

* * * * *